United States Patent
Lomax, Jr. et al.

(10) Patent No.: US 7,674,319 B2
(45) Date of Patent: Mar. 9, 2010

(54) PSA PRESSURE MEASUREMENT AND CONTROL SYSTEM

(75) Inventors: Franklin D. Lomax, Jr., Falls Church, VA (US); Christopher H. Van Dyke, Washington, DC (US); Kelly R. Leitch, Alexandria, VA (US); Richard S. Todd, Annandale, VA (US)

(73) Assignee: H2GEN INNOVATIONS, INC., Alexandria, VA (US)

( * ) Notice: Subject to any disclaimer, the term of this patent is extended or adjusted under 35 U.S.C. 154(b) by 543 days.

(21) Appl. No.: 11/682,699

(22) Filed: Mar. 6, 2007

(65) Prior Publication Data

US 2007/0204748 A1   Sep. 6, 2007

Related U.S. Application Data

(60) Provisional application No. 60/778,912, filed on Mar. 6, 2006.

(51) Int. Cl.
*B01D 53/02* (2006.01)

(52) U.S. Cl. .................. 95/19; 95/96; 96/130

(58) Field of Classification Search ............ 95/19, 95/96, 100, 103; 96/130
See application file for complete search history.

(56) References Cited

U.S. PATENT DOCUMENTS

| | | | |
|---|---|---|---|
| 3,986,849 A | 10/1976 | Fuderer et al. | |
| 4,234,322 A | 11/1980 | De Meyer et al. | |
| 4,315,759 A | 2/1982 | Benkmann | |
| 4,761,165 A * | 8/1988 | Stocker et al. | 95/22 |
| 5,051,115 A * | 9/1991 | Leitgeb et al. | 95/101 |
| 6,565,628 B2 | 5/2003 | Xu et al. | |
| 6,699,307 B1 | 3/2004 | Lomax, Jr. | |
| 6,918,953 B2 | 7/2005 | Lomax, Jr. et al. | |

* cited by examiner

*Primary Examiner*—Robert A Hopkins
(74) *Attorney, Agent, or Firm*—Oblon, Spivak, McClelland, Maier & Neustadt, L.L.P.

(57) ABSTRACT

A pressure swing adsorption system including a plurality of vessels having one or more layers of adsorbent material therein, a feed gas channel, a waste channel, and a product channel. The system also includes at least one parallel channel connected to each of the vessels via a respective conduit with a valve. At least one pressure measuring device i configured to measure a pressure within the parallel channel. And, a controller is provided that is configured to monitor the at least one pressure measured by the at least one pressure measuring device during a PSA cycle performed within the PSA system, in order to determine the performance of the cycle and monitor proper operation of the system.

39 Claims, 8 Drawing Sheets

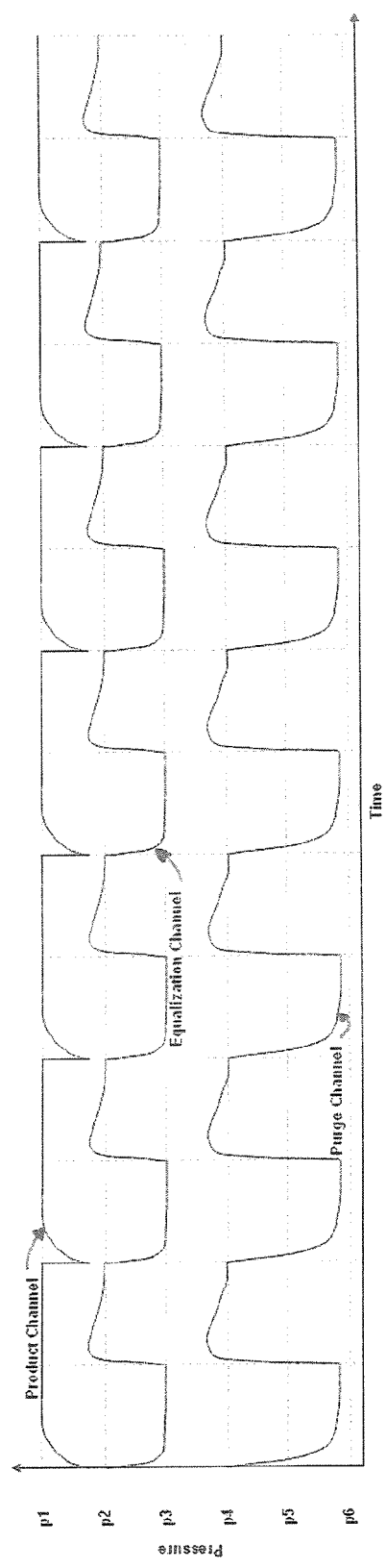
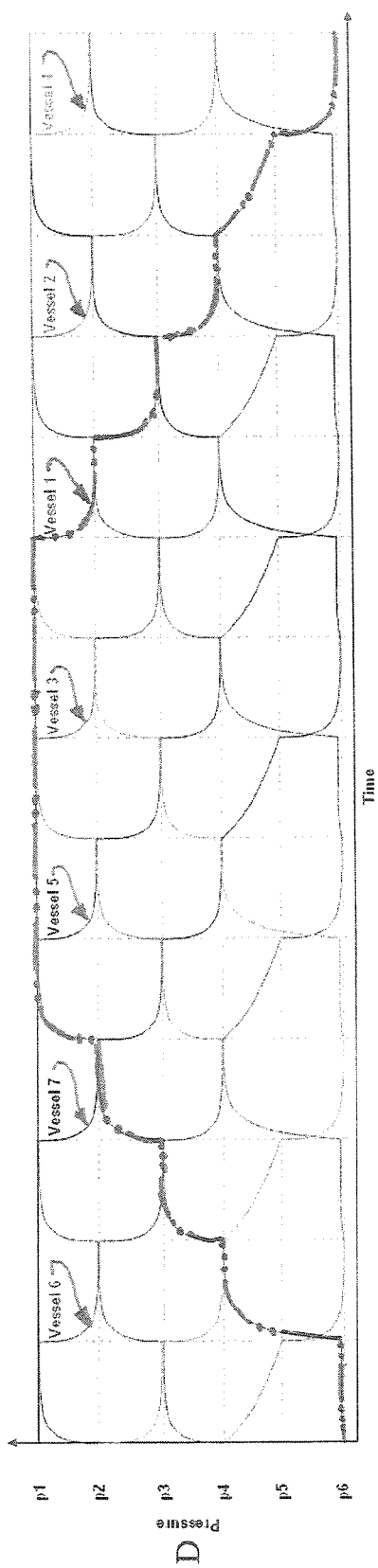
FIG. 1B
FIG. 1C
FIG. 1D

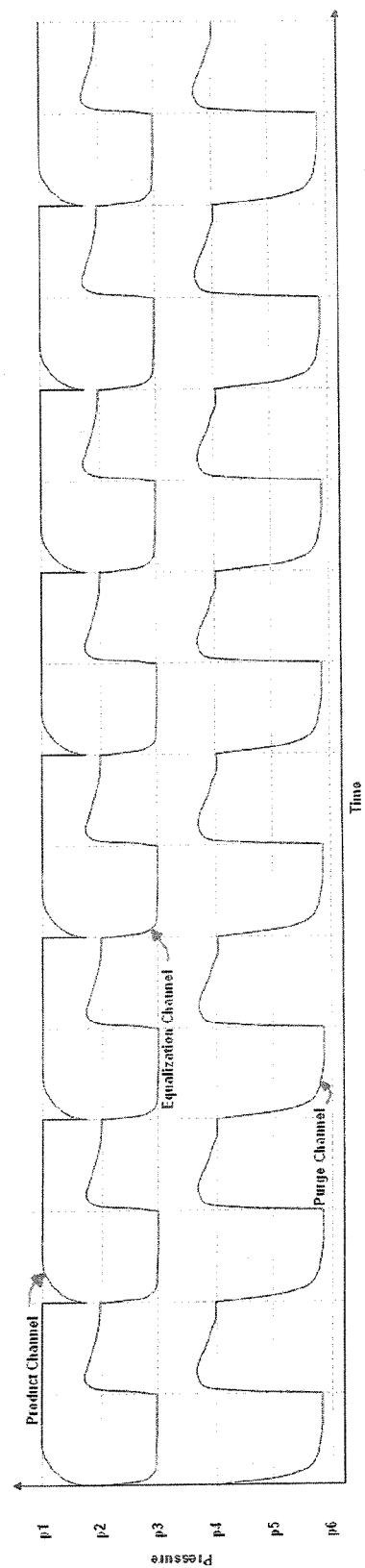
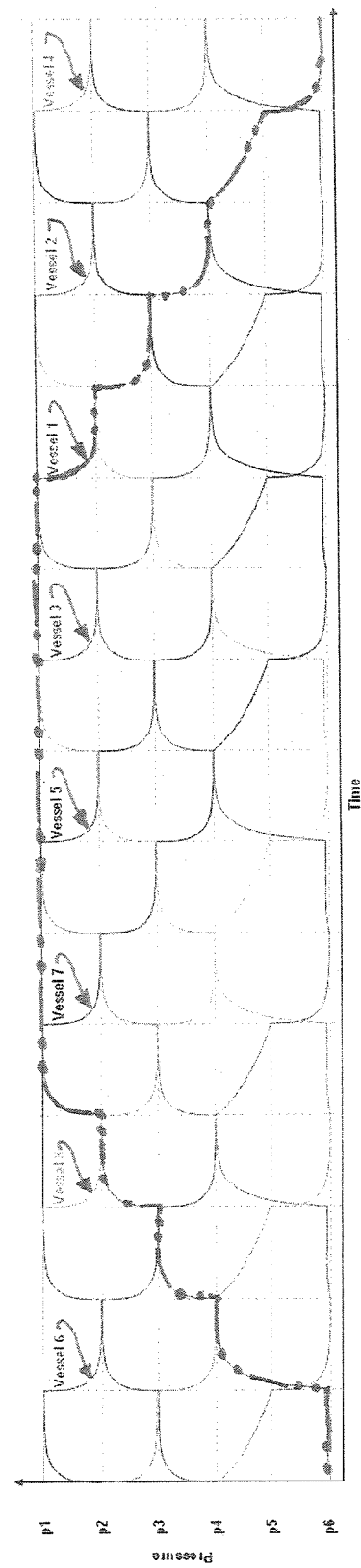
FIG. 2B
FIG. 2C
FIG. 2D

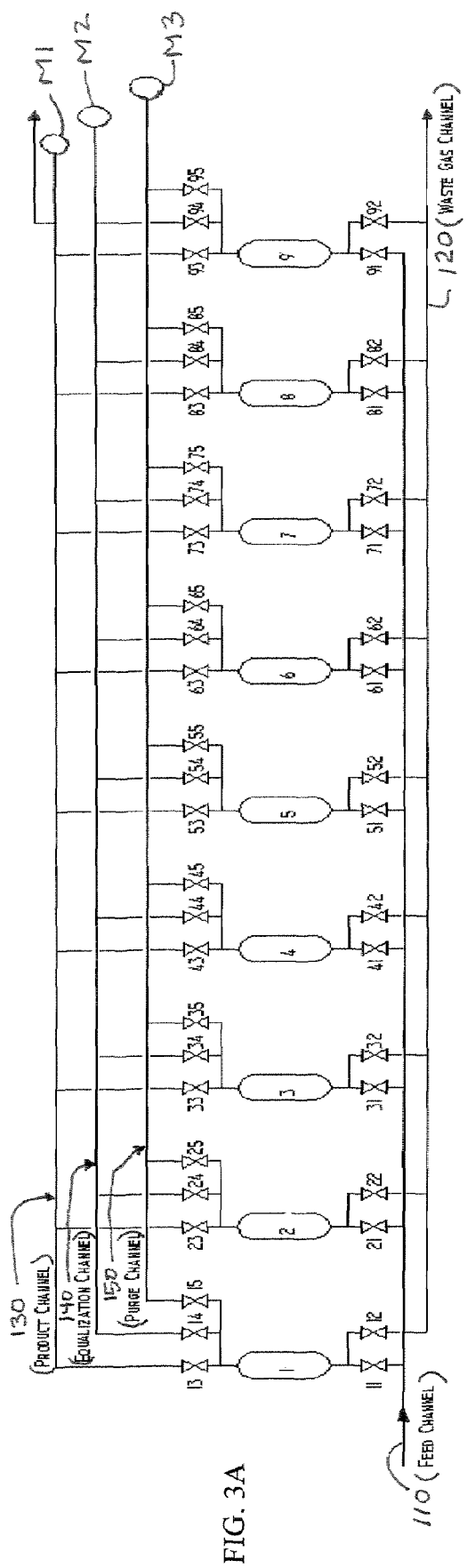
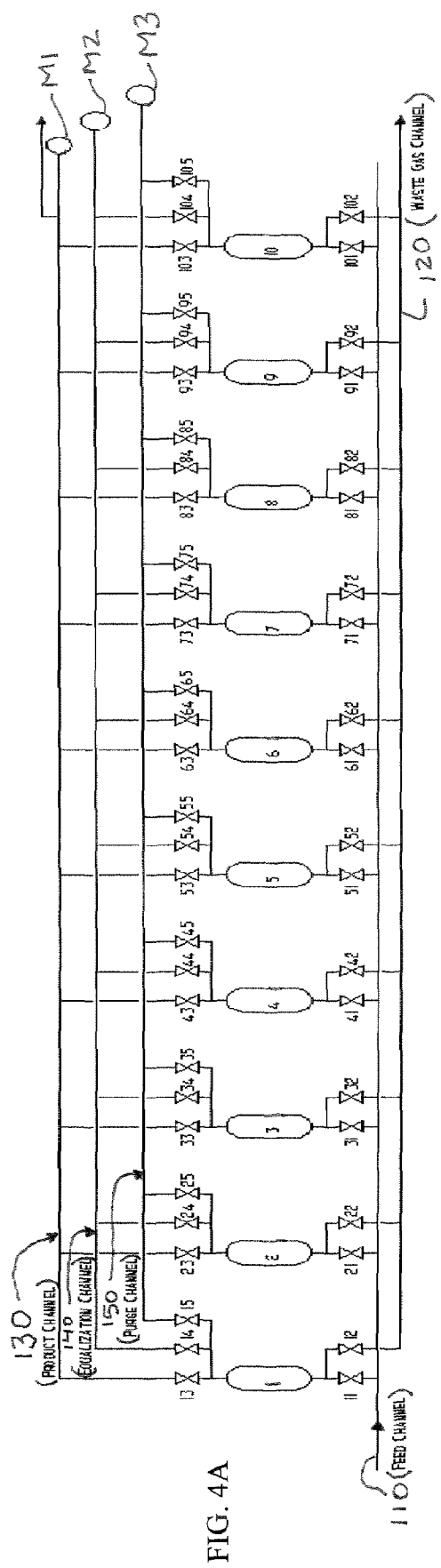
FIG. 3A
FIG. 4A

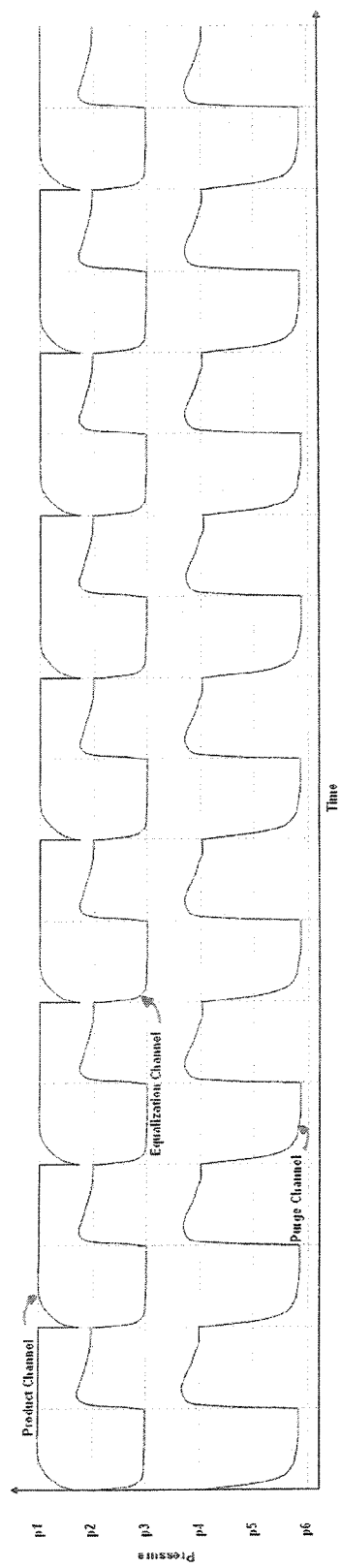
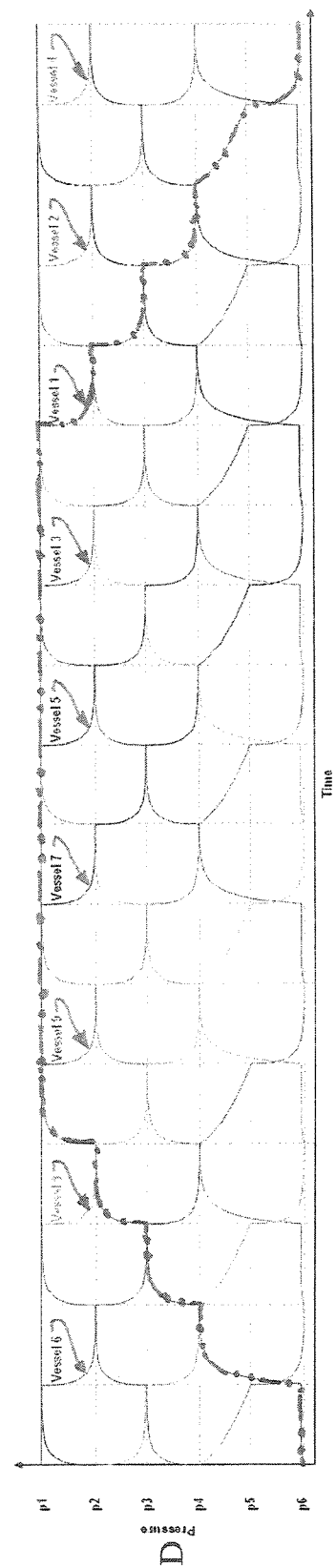
FIG. 3B
FIG. 3C
FIG. 3D

PSA PRESSURE MEASUREMENT AND CONTROL SYSTEM

CROSS-REFERENCE TO RELATED APPLICATION

This application is related to the following application: U.S. Provisional Application Ser. No. 60/778,912, entitled "PSA Pressure Measurement and Control System," filed on Mar. 6, 2006, which is incorporated herein by reference in its entirety.

BACKGROUND OF THE INVENTION

1. Field of the Invention

The present invention generally relates to pressure swing adsorption systems. More specifically, the present invention relates to a monitoring and control system for pressure swing adsorption systems.

2. Discussion of the Background

Pressure swing adsorption (PSA) systems are used for the separation of one or more gases from a mixture of gases. A PSA apparatus usually includes multiple pressure vessels filled with a suitable adsorbent/adsorbents, with each vessel subsequently connected to two or more on-off valves that sequentially admit and expel gases at different pressures in order to affect the gas separation. The PSA cycle is defined by adjusting the time the vessel is open to the product channel relative to the time required to regenerate the adsorbent within each vessel. Given the cyclic nature of a PSA system, multiple vessels operating out of phase with each other is required to maintain constant product delivery. The regeneration stages often involve the exchange of gas between different vessels to perform pressure equalization and purge.

An important aspect of multiple vessel PSA systems is the implementation of pressure equalization to conserve pressure energy. The process of equalizing the pressures between two vessels, rather than expelling the pressure to the waste gas channel, improves the recovery of the lightly adsorbed component. Pressure equalization is performed when gas from a first pressure vessel, at a high pressure, is directed through an on-off valve into a section of pipe (referred to here as the "equalization channel"), fills the equalization channel and is then directed into a second vessel, at a lower pressure, through a second on-off valve. During this pressure equalization stage all remaining on-off valves that connect other vessels to the equalization channel are closed. The first vessel, which is providing gas, decreases in pressure, while the second vessel, which is receiving gas, increases in pressure until the two vessels reach a common final pressure.

The PSA system described in U.S. Pat. No. 6,699,307 to Lomax et al. discloses a seven vessel PSA system with three pressure equalizations. During the first pressure equalization stage, a vessel at high pressure, $p1$, is opened to the equalization channel at the same time a vessel at a lower intermediate pressure, $p3$, opens to the equalization channel. Gas flows through the equalization channel until the two vessels reach an intermediate pressure, $p2$, where $p3<p2<p1$. The second pressure equalization stage opens the vessel that decreased in pressure to $p2$ to the equalization channel at the same time another vessel at a lower intermediate pressure, $p4$, opens to the equalization channel. Gas flows through the equalization channel until the two vessels reach an intermediate pressure, $p3$, where $p4<p3<p2$. The third pressure equalization stage opens the vessel that decreased in pressure to $p3$ to the equalization channel at the same time another vessel at a lower intermediate pressure, $p6$, opens to the equalization channel. Gas flows through the equalization channel until the two vessels reach an intermediate pressure, $p4$, where $p6<p4<p3$. As pressure decreases in the vessel providing equalization gas, the capacity of the adsorbent to retain the impurities in the adsorbed phase decreases according to the equilibrium isotherm and the composition front of each impurity continues to move towards the discharge end where gas is being withdrawn. It is a desirable condition of pressure equalization to prevent the breakthrough of impurities into the equalization channel by providing enough adsorbent mass to take up the propagation of these composition fronts.

Purge is another important aspect of multiple vessel PSA systems to maintain purity of the product gas. If the purge is insufficient, then the impurities desorbed during the depressurization stage are not swept out of the void space, consequently polluting the product on the next production stage. However, if the purge is too great, then the volume of valuable product gas passed back through the vessel is in excess of that required to clean the void space of desorbed impurities at the desired purity level. Over purge results in an undesirable drop in product recovery.

In the PSA cycle described in U.S. Pat. No. 6,699,307 to Lomax et al., the vessel providing purge is progressively decreasing in pressure from some intermediate pressure, $p4$, to a final pressure, $p5$, where $p4>p5$. The purge stage requires the ratio of purge-to-feed gas to be sufficient to maintain product purity, which requires $p5$ to be manipulated in order to attain the required volume of gas passed out of the providing vessel. Although breakthrough of gas impurities during pressure equalization is undesirable, a small amount of breakthrough can happen during purge as pressure further decreases to achieve the desired purge-to-feed ratio. Therefore a time-varying composition that starts relatively clean and progressively increases in impurity levels is passed into a pipe connecting these vessels (referred to here as the "purge channel"). This gas, which has been passed into the purge channel, is expanded across a flow constriction device and then directed into the top of a second vessel that has undergone depressurization and is at the lowest pressure of the cycle. According to the equilibrium isotherm, the lowest pressure during the cycle will concentrate most of the impurities in the void space surrounding the adsorbent. The receive purge stage subsequently involves the sweeping of these impurities from the void space into the waste gas channel of the PSA system using gas directed from the provide purge vessel. In addition, the provide purge stream, enriched in the lightly adsorbed component, further assists desorption of the impurities by reducing their concentration surrounding the adsorbent in the void space.

The gas remaining in the purge channel at the end of the previous purge coupling is heavier in impurities than it was when the provide purge vessel first opened to the purge channel. Therefore, the section of the purge channel between the vessel providing and receiving purge must be flushed by pushing this initially impure gas into the receiving vessel until the flow of gas discharged from the provide purge vessel reaches the receiving vessel. The inventors have determined that if the distance between vessels providing and receiving purge is not held uniform, then the time-varying composition received into the receive purge vessel will also vary. The inventors have determined that his will result in one or several vessels in the system being out of balance with the others in terms of final axial composition through the vessel at the end of purge, potentially resulting in off-specification gas being sent to the product channel on the next production stage.

Comparing multi-vessel PSA systems that invoke, provide, and receive purge in the above manner shows several problems arise with this offset distance between vessels exchanging gas through the purge channel. For example, U.S. Pat. No. 3,986,849 to Fuderer et al. describes a ten vessel system that couples vessels providing and receiving purge at a distance of two vessels apart, with the exception of two of the vessels therein in which the purge channel distance jumps to eight vessels. U.S. Pat. No. 4,315,759 to Benkmann describes a nine vessel system where the distance between coupled purge vessels is two vessels apart, with the exception of two stages where this distance increases to seven vessels. U.S. Pat. No. 6,565,628 to Xu et al. describes a sixteen vessel system where the distance between coupled purge vessels is four vessels apart, with the exception of four stages where this distance extends to twelve vessels. The inventors have determined that such systems will result in one or more vessels being out of balance with the others in terms of final axial composition through the vessel at the end of purge, potentially resulting in off-specification gas being sent to the product channel on the next production stage.

SUMMARY OF THE INVENTION

In an effort to eliminate the above problems, the inventors have constructed a PSA pressure measurement and control system as described below.

The present invention advantageously provides a pressure swing adsorption system including a plurality of vessels having one or more layers of adsorbent material therein, a feed gas channel, a waste channel, and a product channel. The system also includes at least one parallel channel connected to each of the vessels via a respective conduit with a valve. At least one pressure measuring device is provided in the system, and the pressure measuring device is configured to measure a pressure within the parallel channel. And, a controller is provided that is configured to monitor the at least one pressure measured by the at least one pressure measuring device during a PSA cycle performed within the PSA system, in order to determine the performance of the cycle and monitor proper operation of the system.

The present invention advantageously provides a system in which a controller can be used to monitor the PSA cycle performed within a module of the PSA system using only the at least one pressures measured by the at least one pressure measuring device, regardless of the number of vessels used in the module of the PSA system.

The present invention further advantageously provides a method of monitoring a PSA system including performing a PSA cycle using a plurality of vessels, measuring a pressure within at least one parallel channel during the PSA cycle, and monitoring of the performance of the PSA cycle using the measured pressure within the at least one parallel channel.

The present invention allows for the monitoring of the performance of the PSA cycle within a module using only the measured pressure within the at least one parallel channel, regardless of the number of vessels used in the module of the PSA system.

The present invention further provides for controlling a discharge from a waste surge tank connected to the waste channel by using a measured pressure within the product channel.

The present invention also allows for determining a total number of vessels of the plurality of vessels used to perform the PSA cycle such that at least four vessels of the plurality of vessels are open to the feed channel during each stage of the PSA cycle.

The present invention also allows for all stages of the PSA cycle to be configured to minimize a distance between a vessel of the plurality of vessels that is providing purge gas and a vessel of the plurality of vessels that is receiving the purge gas from the first vessel.

The present invention further advantageously provides a method of monitoring a hydrogen generator system including a reactor connected to a PSA system including a feed gas channel receiving feed gas from the reactor, where the method includes measuring a pressure of flow upstream of the reactor; measuring a pressure within a product channel during performance of a PSA cycle using a plurality of vessels, and monitoring pressure drop across the reactor using the measured pressure of flow upstream and an average of a high pressure value measured within the product channel.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 1B is a PSA cycle arrangement for the seven vessel PSA system of FIG. 1A;

FIG. 1C is a graph of pressure traces according to the present invention in which pressure measurement devices are provided in the product channel, equalization channel, and the purge channel of the seven vessel PSA system of FIG. 1A, shown in correspondence with the PSA cycle arrangement of FIG. 1B;

FIG. 1D is a graph of pressure traces according to the related art in which pressure transducers are provided in each vessel of the seven vessel PSA system of FIG. 1A, shown in correspondence with the PSA cycle arrangement of FIG. 1B;

FIG. 2B is a PSA cycle arrangement for the eight vessel PSA system of FIG. 2A;

FIG. 2C is a graph of pressure traces according to the present invention in which pressure measurement devices are provided in the product channel, equalization channel, and the purge channel of the eight vessel PSA system of FIG. 2A, shown in correspondence with the PSA cycle arrangement of FIG. 2B;

FIG. 2D is a graph of pressure traces according to the related art in which pressure transducers are provided in each vessel of the eight vessel PSA system of FIG. 2A, shown in correspondence with the PSA cycle arrangement of FIG. 2B;

FIG. 3A is a schematic diagram of a nine vessel PSA system;

FIG. 3B is a PSA cycle arrangement for the nine vessel PSA system of FIG. 3A;

FIG. 3C is a graph of pressure traces according to the present invention in which pressure measurement devices are provided in the product channel, equalization channel, and the purge channel of the nine vessel PSA system of FIG. 3A, shown in correspondence with the PSA cycle arrangement of FIG. 3B;

FIG. 3D is a graph of pressure traces according to the related art in which pressure transducers are provided in each vessel of the nine vessel PSA system of FIG. 3A, shown in correspondence with the PSA cycle arrangement of FIG. 3B;

FIG. 4A is a schematic diagram of a ten vessel PSA system;

FIG. 4B is a PSA cycle arrangement for the ten vessel PSA system of FIG. 4A;

DETAILED DESCRIPTION OF THE INVENTION

Figure 1A:
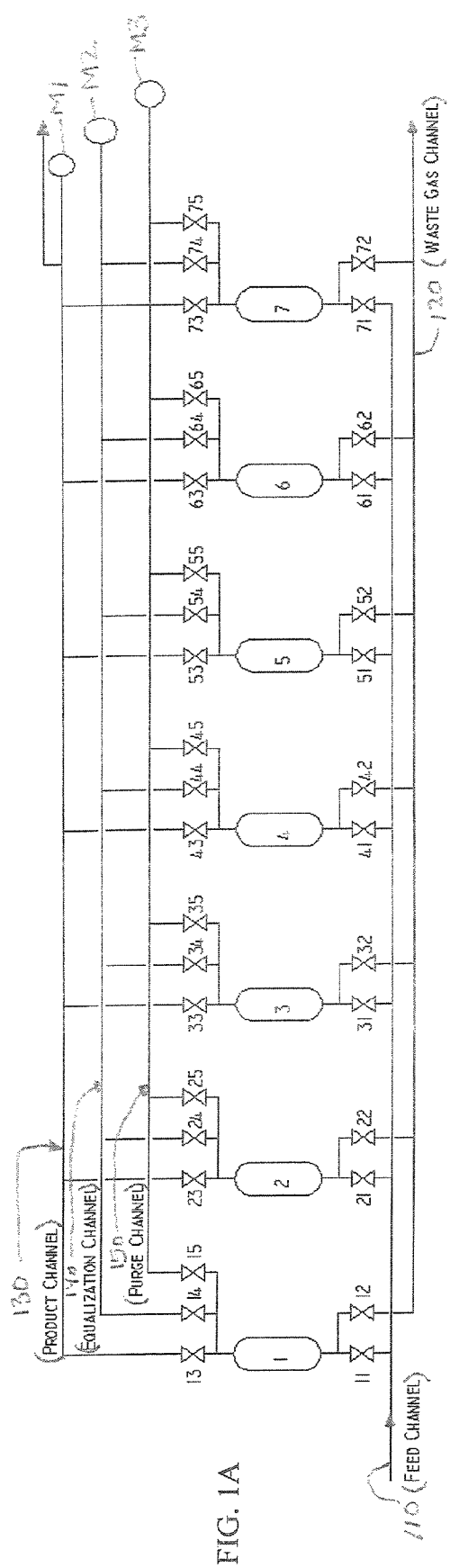
FIG. 1A is a schematic diagram of a seven vessel PSA system.

Embodiments of the present invention will be described hereinafter with reference to the accompanying drawings. In the following description, the constituent elements having substantially the same function and arrangement are denoted by the same reference numerals, and repetitive descriptions will be made only when necessary.

A first aspect of the present invention provides that, from a control standpoint, it is critical to verify that each stage of the cycle has been properly performed and that the correct sequencing of opening and closing on-off valves to the equalization, purge and product channels has occurred. In addition to verifying proper valve functioning during normal operation, accurate and real-time knowledge of the pressure in each of the vessels in the PSA system can be used to:

1.) Pre-fill the vessels with gas during startup;

2.) Depressurize the vessels to a pre-determined pressure at shutdown; and

3.) Verify leak-tightness of the PSA system through an automatic or manual pressure check procedure.

Although the use of one or more pressure measuring devices for each vessel can be used to achieve the desired goals, it disadvantageously increases cost and complexity. The inventors have determined that, with the vessels connected through parallel channels, such as the equalization, purge and product channels previously identified, only one pressure measuring device is needed for each parallel channel, i, in order to achieve the desired goals for any number of vessels, N, connected to the parallel channel(s), i. For example, in a seven vessel configuration performing three pressure equalizations, three pressure measuring devices M1, M2, and M3 can be provided in the three parallel channels 130, 140, and 150 in the top head, as is depicted in FIG. 1A. Thus, according to the present invention, the number of pressure measuring devices used in this configuration is three, which is advantageously less than half the number that would be required if one or more pressure measuring devices was provided for each vessel (i.e. seven vessels and seven pressure transducers) as in the related art. Alternatively, it is possible to use only sensors in the purge and equalization channels in configurations in which multiple modules are used in parallel. Also, it is noted that the invention can be applied to cycles that include any number of equalizations (e.g., one, two, three, etc.), and any number of vessels. For example, the invention can be applied to a simple two equalization cycle in which only one or two sensors may be required to effectively monitor and control the system.

The control system can advantageously be used in conjunction with a communication means, such as an Ethernet connection, to facilitate the remote monitoring of the operation of the PSA. The data received via the communication means cab then be used to remotely identify the root cause of any observed failure mode. Such a remote monitoring operation can be used together with or independent of any local human machine interface, which would provide detailed fault codes based upon the information from the pressure sensors. Because each of the pressure measuring devices, i, fluctuates between two well-defined pressure values, it is possible to use simple pressure switches in lieu of continuous pressure measuring device, such as pressure transducers. The use of simply pressure switches advantageously reduces the cost of the pressure measuring devices and allows for a simple, digital control system using the data from the pressure measuring devices, i, in combination with knowledge of the duration of the stages of the PSA cycle.

A second aspect of the present invention provides that vessels performing purge should be as close as is practically possible to each other in the flowsheet. The present invention teaches that a logical cycle arrangement should be implemented to avoid a select number of vessels being a significant distance apart from the majority of purge couplings when the system contains a large number of vessels. The current disclosure proposes a PSA cycle for N vessels that is arranged as follows:

1.) Start stage 1 with vessel 2 providing purge and vessel 1 receiving purge;

2.) Allocate vessel 4 to provide purge in the stage when vessel 2 receives purge;

3.) Allocate vessel i (i is even, i≦N, i≧4) to provide purge in the stage when vessel i−2 receives purge;

4.) Repeat step 3.) until vessel N is reached or N−1 if N is odd,

If N is odd, allocate vessel N to provide purge in the stage when vessel N−1 receives purge;

5.) a.) If N is even, allocate vessel N−1 to provide purge in the stage when vessel N receives purge, b.) If N is odd, allocate vessel N−2 to provide purge in the stage when vessel N receives purge; and 6.) a.) If N is even, allocate vessel i (where i=N−3, N−5, N−7 etc, i>1) to provide purge in the stage when vessel i+2 receives purge, b.) If N is odd, allocate vessel i (where i=N−4, N−6, N−8 etc, i>1) to provide purge in the stage when vessel i+2 receives purge.

The above two aspects of the present invention provide improvements that are several fold in the control and operation of a multiple vessel PSA system. Table 1 compares these improvements in terms of the total number of pressure vessels required in the system that need to be filled with adsorbent, number of pressure sensors that are required per number of vessels in the system, number of vessels open to the feed gas channel processing the incoming gas mixture, total number of on-off valves required to invoke the PSA separation and number of external connections required around the PSA system.

TABLE 1

Comparing related art with the present invention for various vessel numbers.

| Number of PSA Modules | Number of Vessels per Module | Total Number of Vessels with Adsorbent in system | | Number of Pressure Sensors per Vessel | | Number of Vessels Open to Feed Line at any Point During Cycle | | Total Number of on-off Valves Required | | Number of External Pipe Connections across all Modules | |
|---|---|---|---|---|---|---|---|---|---|---|---|
| | | Related Art | Present Invention | Related Art | Present Invention | Related Art | Present Invention | Related Art | Present Invention | Related Art | Present Invention |
| 1 | 6 | 6 | 6 | 1 | 0.500 | 1 | 1 | 30 | 30 | 3 | 3 |
| 2 | 6 | 12 | 6 | 1 | 0.500 | 2 | 1 | 60 | 30 | 6 | 3 |
| 3 | 6 | 18 | 6 | 1 | 0.500 | 3 | 1 | 90 | 30 | 9 | 3 |
| 4 | 6 | 24 | 6 | 1 | 0.500 | 4 | 1 | 120 | 30 | 12 | 3 |
| 1 | 7 | 7 | 7 | 1 | 0.429 | 2 | 2 | 35 | 35 | 3 | 3 |
| 2 | 7 | 14 | 7 | 1 | 0.429 | 4 | 2 | 70 | 35 | 6 | 3 |
| 3 | 7 | 21 | 7 | 1 | 0.429 | 6 | 2 | 105 | 35 | 9 | 3 |
| 4 | 7 | 28 | 7 | 1 | 0.429 | 8 | 2 | 140 | 35 | 12 | 3 |
| 1 | 8 | 8 | 8 | 1 | 0.375 | 3 | 3 | 40 | 40 | 3 | 3 |
| 1 | 9 | 9 | 9 | 1 | 0.333 | 4 | 4 | 45 | 45 | 3 | 3 |
| 1 | 10 | 10 | 10 | 1 | 0.300 | 5 | 5 | 50 | 50 | 3 | 3 |
| 1 | 11 | 11 | 11 | 1 | 0.273 | 6 | 6 | 55 | 55 | 3 | 3 |
| 1 | 12 | 12 | 12 | 1 | 0.250 | 7 | 7 | 60 | 60 | 3 | 3 |

The associated complexity and cost associated with control and monitoring of the PSA system is reduced with the use of pressure sensors, i, for any number of vessels, N, in the system. In the related art system, the system monitors a continuously-varying pressure signal for each one of the vessels, examples of which can be seen in FIGS. 1D, 2D, 3D, and 4D (note that the pressure trace for vessel 1 is in bold, and the other vessels have the same shape pressure trace, but which are staggered in time), for comparison with the present invention. However, when the system is configured according to the present invention, as in FIGS. 1A, 2A, 3A, and 4A, each of the pressure measuring devices, i, in the parallel channels records a pressure pulse for each vessel in its turn, examples of which can be seen in FIGS. 1C, 2C, 3C, and 4C. Thus, in the seven vessel system as depicted in FIGS. 1A-1C, using three pressure equalizations, the pressure measuring device M1 in the product channel 130 records a dip in pressure at each instance of the final pressurization stage. Thus, if the final pressurization stage does not occur due to the failure of the vessel product valve to open, this dip in pressure will not be apparent at the appropriate time.

In the case of the equalization channel 140 that handles the first and second equalizations, the pressure as measured by the pressure measuring device M2 in the equalization channel 140 will cycle between a pressure, p2, achieved at the end of the first pressurization and a lower pressure, p3, achieved at the end of the second equalization. The pressure measuring device M3 in the purge channel 150, which is used to execute the third pressure equalization and purge stages, will record pressures that vary between the final equalization pressure, p4, and a pressure close to the lowest in the system, p6, due to throttling devices (not shown) in the purge channel 150. In the case of either of the pressure measuring device M2 or the pressure measuring device M3, it is clear that if a malfunction occurs in any of these stages, the pressure readings will not reach the desired values at the proper time. Thus, a control system for use with the pressure measuring devices can be used to monitor the pressures and correlate the pressures achieved in each of the three pressure measuring devices and identify suspected failures to notify an operator of the failure for maintenance, and possible reconfiguration until maintenance can be performed. Advantageously, the control system can even narrow down the possible failure points to valves associated only with the expected pressure change of the vessels in question. Such diagnostics can allow for possible reconfiguration of the system, for example, by switching the cycle arrangement so that the faulty valve/vessel is excluded from the cycle so that system can continue performing a PSA cycle until maintenance can be performed on the faulty component.

Four different examples applying the PSA cycle arrangement of the present invention for seven, eight, nine, and ten vessel PSA systems, which each initiate three pressure equalization stages, are depicted in FIGS. 1A-1C, 2A-2C, 3A-3C, and 4A-4C, respectively. FIGS. 1A, 2A, 3A, and 4A depict piping and instrumentation schematic diagrams for each PSA system layout with pressure measuring devices M1, M2 and M3 shown on the product channel 130, the equalization channel 140, and the purge channel 150, respectively. FIGS. 1B, 2B, 3B, and 4B show the resulting cycle arrangement for the respective PSA systems, and FIGS. 1C, 2C, 3C, and 4C are graphs of pressure traces recorded from these respective arrangements. More specifically, FIGS. 1C, 2C, 3C, and 4C are graphs of pressure traces according to the present invention in which pressure measurement devices are provided in the product channel, equalization channel, and the purge channel of the PSA systems, shown in correspondence with their respective PSA cycle arrangement.

In addition, FIGS. 1D, 2D, 3D, and 4D are graphs of pressure traces installed in the PSA systems using the related art method of including a pressure transducer in each vessel of the PSA system. In each of FIGS. 1D, 2D, 3D, and 4D, the pressure trace for vessel 1 is in bold, and the other vessels have the same shape pressure trace as vessel 1 in their respective figure, but the traces of the other vessels are staggered in time as seen in the figures. These related art pressure traces are shown as a comparison to highlight the improvement in diagnostic ability and simplicity provided by the present invention. For example, it is noted that the pressure measuring devices of the present invention each cycle between their own relatively narrow, fixed pressure ranges (e.g., the product channel pressure measuring device M1 cycles generally between p2 and p1, the equalization channel pressure measuring device M2 cycles generally between p3 and p2, and the purge channel pressure measuring device M3 cycles generally between p6 and p4,) while each of the pressure transducers of the related art cycle all the way between p6 and p1. (Note that in the figures $p6<p5<p4<p3<p2<p1$.)

Valve tables associated with the four configurations depicted in FIGS. 1A, 2A, 3A, and 4A, are shown in Tables 2-5, respectively, which indicate the on-off valves that are in an open state at various stages during the PSA cycles shown in FIGS. 1B, 2B, 3B, and 4B, respectively.

TABLE 2

On-off valve table for seven vessel system in FIG. 1A using PSA cycle in FIG. 1B with three pressure equalizations. Any valve not listed above in a stage is closed during that stage.

| | Vessel 1 | | | | | | |
|---|---|---|---|---|---|---|---|
| Stage | 1 | 2 | 3 | 4 | 5 | 6 | 7 |
| 1 | 12, 15 | 25 | 34 | 44 | 53 | 61, 63 | 71, 73 |
| 2 | 15 | 22 | 34 | 45 | 51, 53 | 64 | 71, 73 |
| 3 | 14 | 22, 25 | 33 | 45 | 51, 53 | 64 | 71, 73 |
| 4 | 14 | 25 | 31, 33 | 42 | 51, 53 | 65 | 74 |
| 5 | 13 | 24 | 31, 33 | 42, 45 | 51, 53 | 65 | 74 |
| 6 | 11, 13 | 24 | 31, 33 | 45 | 54 | 62 | 75 |
| 7 | 11, 13 | 23 | 31, 33 | 44 | 54 | 62, 65 | 75 |
| 8 | 11, 13 | 21, 23 | 34 | 44 | 55 | 65 | 72 |
| 9 | 11, 13 | 21, 23 | 34 | 43 | 55 | 64 | 72, 75 |
| 10 | 14 | 21, 23 | 35 | 41, 43 | 52 | 64 | 75 |
| 11 | 14 | 21, 23 | 35 | 41, 43 | 52, 55 | 63 | 74 |
| 12 | 15 | 24 | 32 | 41, 43 | 55 | 61, 63 | 74 |
| 13 | 15 | 24 | 32, 35 | 41, 43 | 54 | 61, 63 | 73 |
| 14 | 12 | 25 | 35 | 44 | 54 | 61, 63 | 71, 73 |

TABLE 3

Figure 2A:
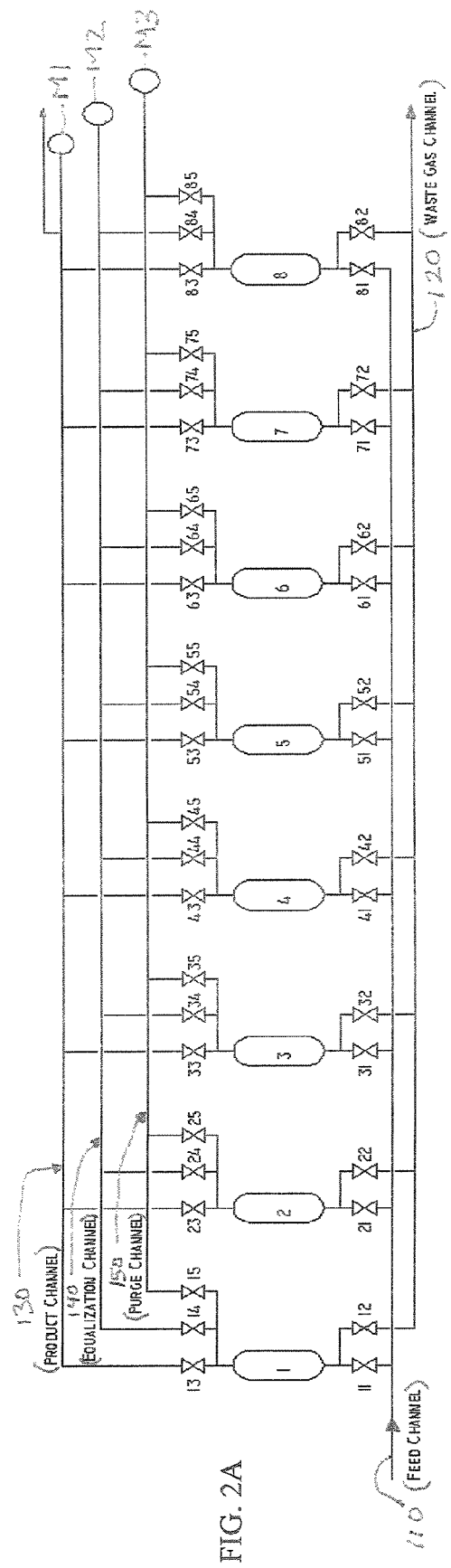
FIG. 2A is a schematic diagram of an eight vessel PSA system.
Figure 4C:
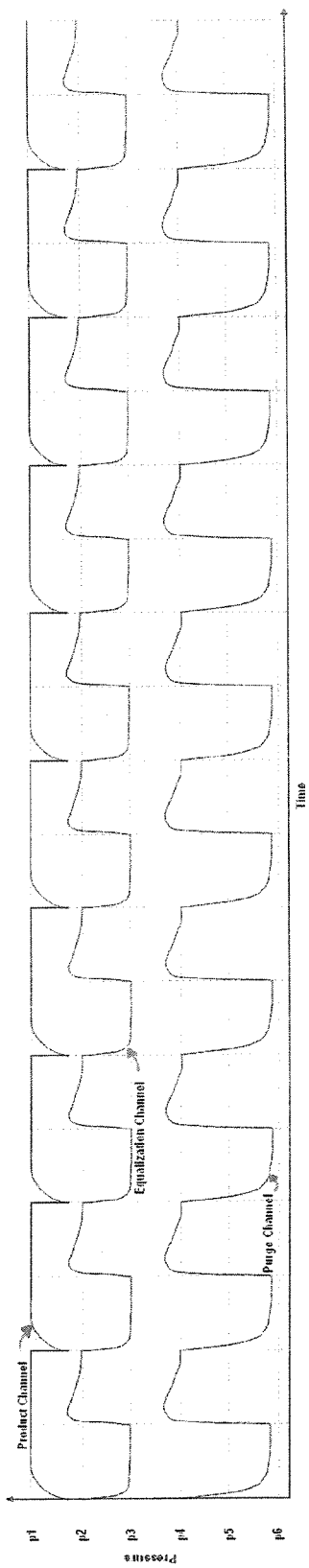
FIG. 4C is a graph of pressure traces according to the present invention in which pressure measurement devices are provided in the product channel, equalization channel, and the purge channel of the ten vessel PSA system of FIG. 4A, shown in correspondence with the PSA cycle arrangement of FIG. 4B.
Figure 4D:
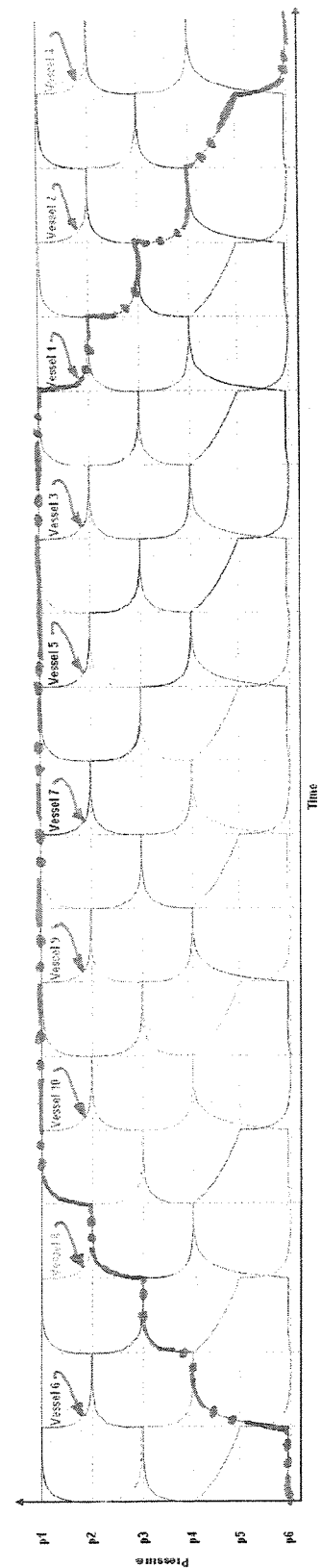
FIG. 4D is a graph of pressure traces according to the related art in which pressure transducers are provided in each vessel of the ten vessel PSA system of FIG. 4A, shown in correspondence with the PSA cycle arrangement of FIG. 4B.

On-off valve table for eight vessel system in FIG. 2A using PSA cycle in FIG. 2B with three pressure equalizations. Any valve not listed above in a stage is closed during that stage.

| | Vessel 1 | | | | | | | |
|---|---|---|---|---|---|---|---|---|
| Stage | 1 | 2 | 3 | 4 | 5 | 6 | 7 | 8 |
| 1 | 12, 15 | 25 | 34 | 44 | 53 | 61, 63 | 71, 73 | 81, 83 |
| 2 | 15 | 22 | 34 | 45 | 51, 53 | 64 | 71, 73 | 81, 83 |
| 3 | 14 | 22, 25 | 33 | 45 | 51, 53 | 64 | 71, 73 | 81, 83 |
| 4 | 14 | 25 | 31, 33 | 42 | 51, 53 | 65 | 71, 73 | 84 |
| 5 | 13 | 24 | 31, 33 | 42, 45 | 51, 53 | 65 | 71, 73 | 84 |
| 6 | 11, 13 | 24 | 31, 33 | 45 | 51, 53 | 62 | 74 | 85 |
| 7 | 11, 13 | 23 | 31, 33 | 44 | 51, 53 | 62, 65 | 74 | 85 |
| 8 | 11, 13 | 21, 23 | 31, 33 | 44 | 54 | 65 | 75 | 82 |
| 9 | 11, 13 | 21, 23 | 31, 33 | 43 | 54 | 64 | 75 | 82, 85 |
| 10 | 11, 13 | 21, 23 | 34 | 41, 43 | 55 | 64 | 72 | 85 |
| 11 | 11, 13 | 21, 23 | 34 | 41, 43 | 55 | 63 | 72, 75 | 84 |
| 12 | 14 | 21, 23 | 35 | 41, 43 | 52 | 61, 63 | 75 | 84 |
| 13 | 14 | 21, 23 | 35 | 41, 43 | 52, 55 | 61, 63 | 74 | 83 |
| 14 | 15 | 24 | 32 | 41, 43 | 55 | 61, 63 | 74 | 81, 83 |
| 15 | 15 | 24 | 32, 35 | 41, 43 | 54 | 61, 63 | 73 | 81, 83 |
| 16 | 12 | 25 | 35 | 44 | 54 | 61, 63 | 71, 73 | 81, 83 |

TABLE 4

On-off valve table for nine vessel system in FIG. 3A using PSA cycle in FIG. 3B with three pressure equalizations. Any valve not listed above in a stage is closed during that stage.

| | Vessel | | | | | | | | |
|---|---|---|---|---|---|---|---|---|---|
| Stage | 1 | 2 | 3 | 4 | 5 | 6 | 7 | 8 | 9 |
| 1 | 12, 15 | 25 | 34 | 44 | 53 | 61, 63 | 71, 73 | 81, 83 | 91, 93 |
| 2 | 15 | 22 | 34 | 45 | 51, 53 | 64 | 71, 73 | 81, 83 | 91, 93 |
| 3 | 14 | 22, 25 | 33 | 45 | 51, 53 | 64 | 71, 73 | 81, 83 | 91, 93 |
| 4 | 14 | 25 | 31, 33 | 42 | 51, 53 | 65 | 71, 73 | 84 | 91, 93 |
| 5 | 13 | 24 | 31, 33 | 42, 45 | 51, 53 | 65 | 71, 73 | 84 | 91, 93 |
| 6 | 11, 13 | 24 | 31, 33 | 45 | 51, 53 | 62 | 71, 73 | 85 | 94 |
| 7 | 11, 13 | 23 | 31, 33 | 44 | 51, 53 | 62, 65 | 71, 73 | 85 | 94 |
| 8 | 11, 13 | 21, 23 | 31, 33 | 44 | 51, 53 | 65 | 74 | 82 | 95 |
| 9 | 11, 13 | 21, 23 | 31, 33 | 43 | 51, 53 | 64 | 74 | 82, 85 | 95 |
| 10 | 11, 13 | 21, 23 | 31, 33 | 41, 43 | 54 | 64 | 75 | 85 | 92 |
| 11 | 11, 13 | 21, 23 | 31, 33 | 41, 43 | 54 | 63 | 75 | 84 | 92, 95 |
| 12 | 11, 13 | 21, 23 | 34 | 41, 43 | 55 | 61, 63 | 72 | 84 | 95 |
| 13 | 11, 13 | 21, 23 | 34 | 41, 43 | 55 | 61, 63 | 72, 75 | 83 | 94 |
| 14 | 14 | 21, 23 | 35 | 41, 43 | 52 | 61, 63 | 75 | 81, 83 | 94 |
| 15 | 14 | 21, 23 | 35 | 41, 43 | 52, 55 | 61, 63 | 74 | 81, 83 | 93 |
| 16 | 15 | 24 | 32 | 41, 43 | 55 | 61, 63 | 74 | 81, 83 | 91, 93 |
| 17 | 15 | 24 | 32, 35 | 41, 43 | 54 | 61, 63 | 73 | 81, 83 | 91, 93 |
| 18 | 12 | 25 | 35 | 44 | 54 | 61, 63 | 71, 73 | 81, 83 | 91, 93 |

TABLE 5

On-off valve table for ten vessel system in FIG. 4A using PSA cycle in FIG. 4B with three pressure equalizations. Any valve not listed above in a stage is closed during that stage.

| Stage | \multicolumn{10}{c}{Vessel} | | | | | | | | | |
|---|---|---|---|---|---|---|---|---|---|---|
| | 1 | 2 | 3 | 4 | 5 | 6 | 7 | 8 | 9 | 10 |
| 1 | 12, 15 | 25 | 34 | 44 | 53 | 61, 63 | 71, 73 | 81, 83 | 91, 93 | 101, 103 |
| 2 | 15 | 22 | 34 | 45 | 51, 53 | 64 | 71, 73 | 81, 83 | 91, 93 | 101, 103 |
| 3 | 14 | 22, 25 | 33 | 45 | 51, 53 | 64 | 71, 73 | 81, 83 | 91, 93 | 101, 103 |
| 4 | 14 | 25 | 31, 33 | 42 | 51, 53 | 65 | 71, 73 | 84 | 91, 93 | 101, 103 |
| 5 | 13 | 24 | 31, 33 | 42, 45 | 51, 53 | 65 | 71, 73 | 84 | 91, 93 | 101, 103 |
| 6 | 11, 13 | 24 | 31, 33 | 45 | 51, 53 | 62 | 71, 73 | 85 | 91, 93 | 104 |
| 7 | 11, 13 | 23 | 31, 33 | 44 | 51, 53 | 62, 65 | 71, 73 | 85 | 91, 93 | 104 |
| 8 | 11, 13 | 21, 23 | 31, 33 | 44 | 51, 53 | 65 | 71, 73 | 82 | 94 | 105 |
| 9 | 11, 13 | 21, 23 | 31, 33 | 43 | 51, 53 | 64 | 71, 73 | 82, 85 | 94 | 105 |
| 10 | 11, 13 | 21, 23 | 31, 33 | 41, 43 | 51, 53 | 64 | 74 | 85 | 95 | 102 |
| 11 | 11, 13 | 21, 23 | 31, 33 | 41, 43 | 51, 53 | 63 | 74 | 84 | 95 | 102, 105 |
| 12 | 11, 13 | 21, 23 | 31, 35 | 41, 43 | 54 | 61, 63 | 75 | 84 | 92 | 105 |
| 13 | 11, 13 | 21, 23 | 31, 33 | 41, 43 | 54 | 61, 63 | 75 | 83 | 92, 95 | 104 |
| 14 | 11, 13 | 21, 23 | 34 | 41, 43 | 55 | 61, 63 | 72 | 81, 83 | 95 | 104 |
| 15 | 11, 13 | 21, 23 | 34 | 41, 43 | 55 | 61, 63 | 72, 75 | 81, 83 | 94 | 103 |
| 16 | 14 | 21, 23 | 35 | 41, 43 | 52 | 61, 63 | 75 | 81, 83 | 94 | 101, 103 |
| 17 | 14 | 21, 23 | 35 | 41, 43 | 52, 55 | 61, 63 | 74 | 81, 83 | 93 | 101, 103 |
| 18 | 15 | 24 | 32 | 41, 43 | 55 | 61, 63 | 74 | 81, 83 | 91, 93 | 101, 103 |
| 19 | 15 | 24 | 32, 35 | 41, 43 | 54 | 61, 63 | 73 | 81, 83 | 91, 93 | 101, 103 |
| 20 | 12 | 25 | 35 | 44 | 54 | 61, 63 | 71, 73 | 81, 83 | 91, 93 | 101, 103 |

In FIGS. 1B, 2B, 3B, and 4B, "Recv PE 1," "Recv PE 2," and "Recv PE 3" denote first, second third stages of receiving pressure equalization gas, respectively; "Prov PE 1," "Prov PE 2," and "Prov PE 3" denote first, second, and third stages of providing pressure equalization gas, respectively; "Receive PG" denotes a receive purge stage; "Provide PG" denotes a provide purge stage; "Blowdown" denotes depressurization to the lowest pressure of the system; and "Adsorption" denotes a stage where the vessel is at high pressure and preferably making enriched product gas. Note that the present invention can be implemented in a variety of different PSA cycle configurations, for example, any variations in the number of pressure equalizations, initiating a period of feed or product repressurization during the "Final Press" stage, or any other variant around the purge coupling stages known to those skilled in the art can be utilized.

Another advantage of the current aspect of the invention is the ability to have more vessels open to the feed channel for a modest increase in the total number of vessels within the system. When scaling up to a higher capacity, often the diameter of each vessel needs to be increased to handle the greater throughput of gas entering the feed channel. In addition to the cost increase associated with the fabrication of larger diameter vessels, traditional methods used to hold the adsorbent down within the vessel in order to prevent fluidization become difficult and subsequent pellet attrition during PSA operation can occur.

A novel scaling procedure disclosed in U.S. Pat. No. 6,918,953 to Lomax et al. indicates that PSA capacity can be increased by adding additional PSA modules to the system. The concept behind this modular design is that a single PSA module that contains a specified number of vessels (such as a seven vessel PSA module) can process a certain volume of gas at the upper operating limit for a particular purity. The diameter of each vessel within a single PSA module is small enough to ensure vessel fluidization and channeling, which can arise in larger diameter vessels as a result of uneven adsorbent loading and settling, does not occur. Stepping up in throughput beyond the single PSA module requires the addition of more PSA modules, thereby increasing the volume of adsorbent available to invoke the desired PSA separation without changing the operating conditions present within each vessel. For example, a two fold increase in the volume of gas that can be treated by a single PSA module requires the addition of a second PSA module. The addition of the second module means twice the volume of feed gas is split between twice the number of vessels (e.g., an increase from seven vessels to 14 vessels) open at any one time during the cycle so the specific conditions present within any one vessel do not change.

The exemplary embodiment in U.S. Pat. No. 6,918,953 shows that each PSA module has two vessels open to the feed gas at any one point during the cycle, while the other five vessels are undergoing various stages of regeneration, such as pressure equalization, purge, or blowdown. However, applying the modular design means that doubling PSA capacity requires an additional seven vessel PSA module to be added to the system, thereby doubling the adsorbent inventory, number of pressure vessels, and associated fittings in the PSA system. The addition of the second module also introduces an additional level of complexity by adding thirty-five valves along with their associated pneumatic lines.

In contrast to the above scaling by adding additional modules, the present invention teaches that if, for example, an individual seven vessel PSA module were to be extended to a single nine vessel PSA module (e.g., by extending the top and bottom header sections to allow for two additional vessels), then four vessels are now advantageously open to the feed stream at any one point during the cycle, as can be seen by reviewing FIG. 3B. For example, in stage 1, FIG. 3B and Table 4 indicate that valves 61, 71, 81, and 91 are open, thereby connecting vessels 6, 7, 8, and 9, respectively, to the feed channel 110 (see FIG. 3A). Thus, by adding just two vessels (vessels 8 and 9) and the corresponding ten additional valves to the system, the present invention has maintained the same volume of gas being processed per vessel, without introducing an entire second PSA module having seven additional vessels and thirty-five additional valves as required by the related art teaching. As compared to the related art teaching of adding a second module that results in a total of fourteen vessels, the present invention has reduced the adsorbent inventory by 36% by decreasing the total number of vessels from fourteen to nine. In addition, the total number of pressure sensors in the present invention is only three, while the related art system would require fourteen sensors. Furthermore, the reduction in the total number of pressure vessels also reduces the manufacturing and assembly costs in addition to the number of pressure vessels that require ASME approval.

The above scaling rule of the present invention has the advantage of reducing complexity by reducing the number of on-off valves in the system, reducing the volume of adsorbent in the system, reducing the number of pressure vessels in the system, and reducing the number of external fittings required in the system, as compared to related art systems. The added ability of the present invention to include vessels into the manifold arrangement using the purge coupling procedure, in addition the present invention's ability to monitoring pressure pulses in each channel, rather than monitoring individual vessel pressure profiles as in the related art, allows the present invention to minimize the potential for imbalance in the system caused by differing purge channel distances between vessels or a valve failure.

In reviewing the pressure traces of the parallel flow manifolds having channels 130, 140, and 150 shown in FIGS. 1C, 2C, 3C, and 4C, it is clear that the purge channel pressure measuring device M3 (e.g. pressure transducer) shows the minimum pressure achieved during the depressurizing and purging of each PSA vessel. Whether the PSA module or modules are connected to a simple header, or to a buffer tank, it is desirable that the minimum pressure achieved in the depressurization of each vessel should be equal. Otherwise, the degree to which the adsorbed impurity species are desorbed and purged will vary. By using the minimum pressure achieved in the purge header transducer as a proxy for the pressure in the attached header and/or buffer tank, the use of a separate pressure transducer can be eliminated.

Whether a separate transducer is used in the purge header/vessel or whether a purge channel transducer is used, the pressure in this header can be modulated through the use of a proportioning valve that meters the discharge from the header. Such a valve can be modulated to yield a constant average, maximum, or minimum pressure in the purge header, thus resulting in a stable oscillation. This metering valve is advantageously provided with a mechanical pressure regulating valve upstream of the inlet of the metering valve, such that the pressure at the metering valve inlet is essentially constant. This allows the variations in the instantaneous flow-rate through the valve to be minimized, while the metering valve modulation maintains the average flowrate through the valve at a constant value by its response to the pressure input signal.

One advantage in applying this control strategy in conjunction with the pressure measuring technique of the present invention arises when the PSA system 300 is used as a means of controlling a particular component of a hydrogen generating system. A reduction in complexity arises within the hydrogen generating system when the pressure measured within the purge channel (e.g., using purge channel pressure measuring device M3) is coupled to a proportional integral derivative (PID) controller C via wire 126 that regulates a volume of gas released from a waste gas tank 122 connected to the waste gas channel 120. The waste gas tank 122 is sized such that a relatively steady flow of gas can be withdrawn from the PSA system 300 to eliminate the pulsing nature of flow occurring at discrete time intervals associated with blowdown and purge, while, at the same time, minimizing any back-pressure imposed on the PSA system 300 when the receive purge vessel is open to the waste gas tank 122 via the waste gas channel 120. Typically, gas leaving the tank 122 is recycled to a burner 128 via line 124 to be used as fuel to heat a reactor 200 of the hydrogen generating system.

Figure 5:
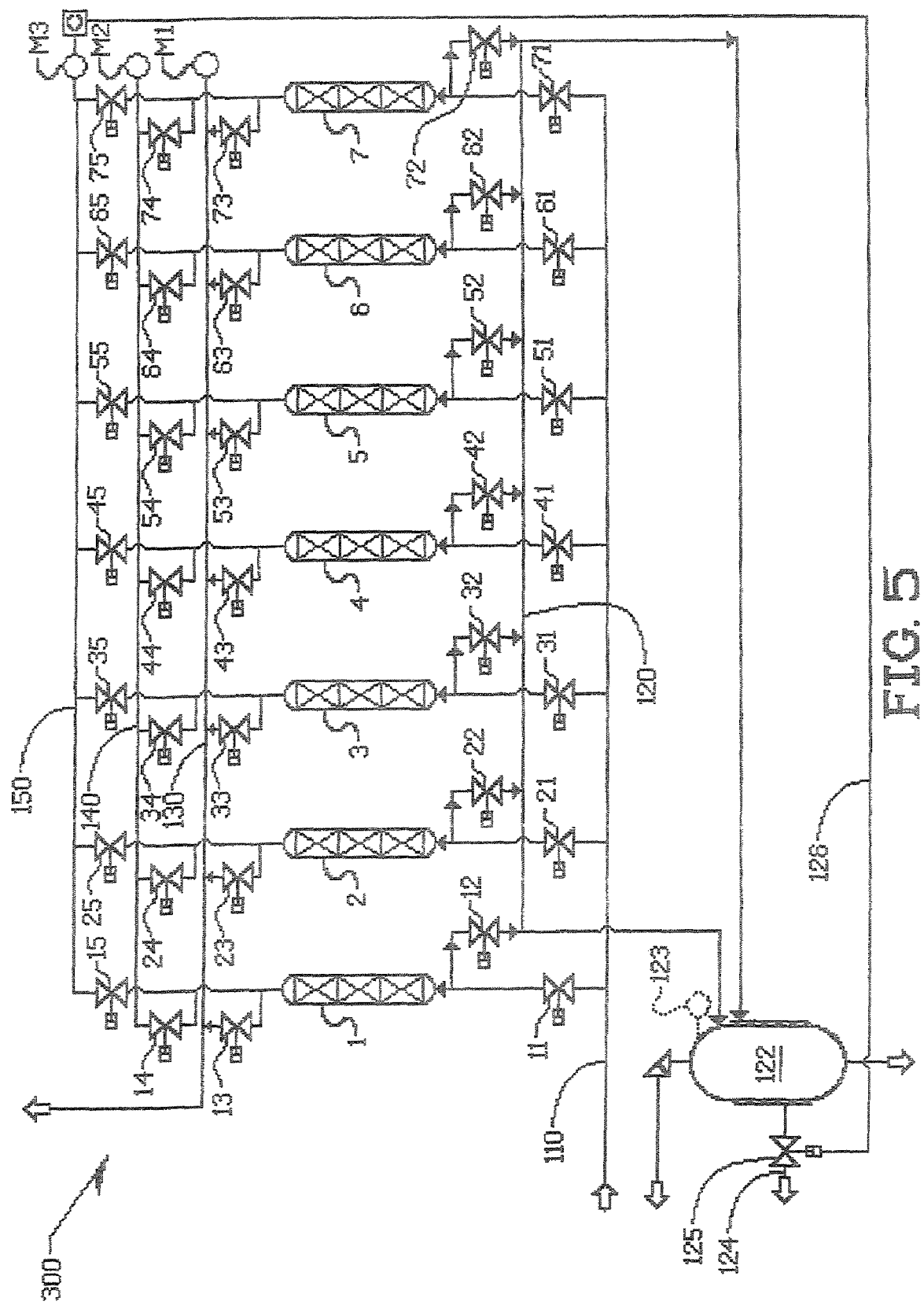
FIG. 5 is a schematic diagram of a seven vessel PSA system depicting an advantage of the present invention.

The purpose of the PID controller C is to regulate the volume of gas withdrawn from the waste gas tank 122 such that the vessel undergoing the receive purge step (i.e. "Receive PG") remains at the desired low pressure. In related art systems, due to the pulsing nature of flow leaving the PSA, a transducer (shown in phantom lines and labeled as 123 in FIG. 5) is provided in the waste gas tank 122 and an average of the pressure recorded by that transducer during blowdown and purge is used as the PID controlled variable by which adjustments are made to control a proportional valve 125 in line 124. The present invention advantageously allows for the elimination of the transducer 123 (thus depicted in phantom lines) and control of the proportional valve 125 using the PID controller C based on the lowest pressure achieved in the purge channel 150 as measured by pressure measuring device M3. The elimination of the transducer 123 results in a reduction in complexity of the hydrogen generating system. The reduction of the total number of pressure transducers in the hydrogen generating system by one reduces complexity without affecting operation or controllability of the hydrogen generating system.

Figure 6:
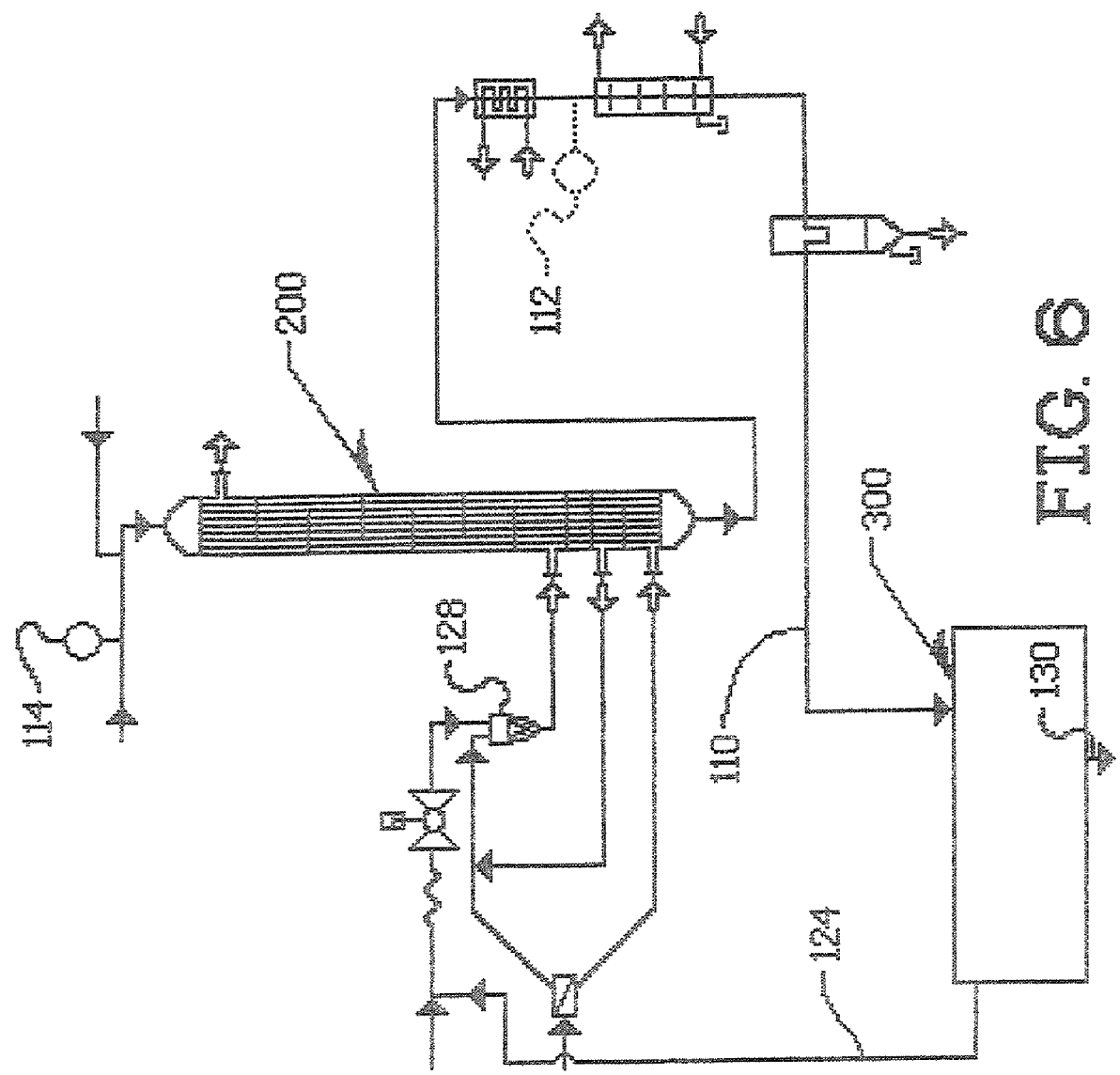
FIG. 6 is a schematic diagram of a hydrogen generator system depicting an advantage of the present invention.

An additional advantage of the pressure measuring technique of the present invention arises when the pressure measurement in the product channel 130 (e.g., using the product channel pressure measuring device (M1)) is integrated with other components of the hydrogen generating system. In related art systems, an additional pressure transducer (shown in phantom lines and labeled as 112 in FIG. 6) is located after the reactor system 200 and is used to monitor pressure drop over the reactor 200 based on a difference in pressures between a location upstream of the reactor system 200 measured using a pressure transducer 114, and the pressure downstream of the reactor system 200 measured using pressure transducer 112. If a reactor tube was to become blocked (i.e. due to cooking under an abnormal operating condition) the difference in pressure measured by pressure transducer 114 and the pressure measured by pressure transducer 112 will increase significantly and indicate a problem with the passage of gas through the reactor. Pressure transducer 112 located after the reactor is exposed to a hot and wet environment. During normal operation this gas is at a temperature close to 300° C., which can lead to high thermal stresses on sensitive internal components of the pressure transducer. After shutdown, water can become entrapped against the diaphragm of a pressure transducer that is exposed to the process gas. If ambient temperatures drop below freezing, this water will freeze and expand forming ice that can damage sensitive components connected to the diaphragm within the pressure transducer.

The present invention provides a unique solution to these problems with the related art systems. Given that the majority of pressure drop occurs over the reactor and that the associated pressure drop through the condenser and PSA vessel is minor by comparison, the present invention allows for the elimination of pressure transducer 112 (thus depicted in phantom lines) by performing the calculation for reactor pressure drop based on the average of the high pressure measured in the product channel 130 of the PSA header. This configuration eliminates the need for a pressure transducer in-line after the reactor. This configuration results in an improvement in operational reliability and a reduction in hydrogen generating system complexity by using the product channel pressure transducer M1 for monitoring reactor pressure drop.

A further advantage of the disclosed pressure measuring technique arises when the PSA system is to be started up or shut down using a pre-defined valve opening sequence. At start-up, the product channel pressure transducer M1 can be used to verify the PSA system 300 goes through the desired rate of pressure increase with time for a select number of vessels that open to the product channel 130. If this rate of increase is too fast or too slow as compared to the desired rate of pressure increase, then a valve failure is likely to have occurred. Similarly, if a select number of vessels need to be equalized at some intermediate pressure following the product backfill stage, then the equalization channel pressure transducer M2 can be used to verify the required on-off valves opened and the desired pressure level is achieved. At shutdown, the sequence of stepping down vessel pressure to that of the waste gas channel 120 can be verified through the sequence of opening vessels to the equalization channel 140. Once all vessels have equalized in pressure to the waste gas channel 120, then purge can be initiated through the product channel 130 to remove impurities from the void space around adsorbent in each vessel to shut the PSA system 300 down in a clean state in readiness for the next start-up.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A pressure swing adsorption (PSA) system comprising:
    a plurality of vessels having one or more layers of adsorbent material therein;
    a feed gas channel connected to said plurality of vessels via a respective first conduit with a first valve;
    a waste channel connected to said plurality of vessels via a respective second conduit with a second valve;
    a product channel connected to said plurality of vessels via a respective third conduit with a third valve;
    a parallel channel connected to said plurality of vessels via a respective fourth conduit with a fourth valve;
    a first pressure measuring device configured to measure a pressure within said parallel channel; and
    a controller configured to monitor the pressure measured by said first pressure measuring device during a PSA cycle performed within said PSA system.

2. The PSA system according to claim 1, wherein said controller is configured to monitor said PSA system when said plurality of adsorbent chambers operate utilizing one or more pressure equalizations during the PSA cycle.

3. The PSA system according to claim 1, wherein said controller is configured to monitor the PSA cycle performed within said PSA system using only the pressure measured by said first pressure measuring device.

4. The PSA system according to claim 1, further comprising a second pressure measuring device configured to measure a pressure within said product channel,
    wherein said controller is configured to monitor the pressure measured by said second pressure measuring device during the PSA cycle performed within said PSA system.

5. The PSA system according to claim 4, wherein said controller is configured to monitor the PSA cycle performed within said PSA system using only the pressures measured by said first pressure measuring device and said second pressure measuring device.

6. The PSA system according to claim 4, further comprising:
    a purge channel connected to said plurality of vessels via a respective fifth conduit with a fifth valve; and
    a third pressure measuring device configured to measure a pressure within said purge channel,
    wherein said parallel channel is an equalization channel, and
    wherein said controller is configured to monitor the pressure measured by said third pressure measuring device during the PSA cycle performed within said PSA system.

7. The PSA system according to claim 6, wherein said controller is configured to monitor the PSA cycle performed within said PSA system using only the pressures measured by said first pressure measuring device, said second pressure measuring device, and said third pressure measuring device.

8. The PSA system according to claim 1, further comprising:
    a purge channel connected to said plurality of vessels via a respective fifth conduit with a fifth valve; and
    a second pressure measuring device configured to measure a pressure within said purge channel,
    wherein said parallel channel is an equalization channel, and
    wherein said controller is configured to monitor the pressure measured by said second pressure measuring device during the PSA cycle performed within said PSA system.

9. The PSA system according to claim 8, wherein said controller is configured to monitor the PSA cycle performed within said PSA system using only the pressures measured by said first pressure measuring device and said second pressure measuring device.

10. The PSA system according to claim 8, further comprising a waste surge tank connected to said waste channel.

11. The PSA system according to claim 10, wherein said controller is configured to control a discharge of said waste surge tank using the pressure measured within said purge channel by said second pressure measuring device.

12. The PSA system according to claim 10, further comprising a pressure measuring device configured to measure pressure within said waste surge tank, wherein said controller is configured to control a discharge of said waste surge tank using the pressure measured within said waste surge tank.

13. The PSA system according to claim 1, wherein said plurality of vessels includes four vessels.

14. The PSA system according to claim 1, wherein said plurality of vessels includes seven or more vessels.

15. The PSA system according to claim 1, wherein said first pressure measuring device is a pressure switch.

16. The PSA system according to claim 1, wherein said first pressure measuring device is a pressure transducer.

17. A method of monitoring a pressure swing adsorption (PSA) system including a plurality of vessels having one or more layers of adsorbent material therein, a feed gas channel connected to the plurality of vessels via a respective first conduit with a first valve, a waste channel connected to the plurality of vessels via a respective second conduit with a second valve, a product channel connected to the plurality of vessels via a respective third conduit with a third valve, and a parallel channel connected to the plurality of vessels via a respective fourth conduit with a fourth valve, said method comprising:

performing a PSA cycle using the plurality of vessels;

measuring a pressure within at least the parallel channel during the PSA cycle; and monitoring of the performance of the PSA cycle using the measured pressure within the parallel channel.

18. The method according to claim 17, wherein the PSA cycle includes one or more pressure equalizations.

19. The method according to claim 17, wherein the monitoring of the performance of the PSA cycle is performed using only the measured pressure within the parallel channel.

20. The method according to claim 17, further comprising measuring a pressure within the product channel during the PSA cycle, wherein the monitoring of the performance of the PSA cycle includes using the measured pressure within the product channel.

21. The method according to claim 20, wherein the monitoring of the performance of the PSA cycle is performed using only the measured pressure within the parallel channel and the measured pressure within the product channel.

22. The method according to claim 20, further comprising measuring a pressure within a purge channel of the PSA system during the PSA cycle, wherein the purge channel is connected to the plurality of vessels via a respective fifth conduit with a fifth valve, wherein the parallel channel is an equalization channel, and wherein the monitoring of the performance of the PSA cycle includes using the measured pressure within at the purge channel, the measured pressure within the equalization channel, and the measured pressure within the product channel.

23. The method according to claim 22, wherein the monitoring of the performance of the PSA cycle is performed using only the measured pressure within the purge channel, the measured pressure within the equalization channel, and the measured pressure within the product channel.

24. The method according to claim 17, further comprising measuring a pressure within a purge channel of the PSA system during the PSA cycle, wherein the purge channel is connected to the plurality of vessels via a respective fifth conduit with a fifth valve, wherein the parallel channel is an equalization channel, and wherein the monitoring of the performance of the PSA cycle includes using the measured pressure within the purge channel and the measured pressure within the equalization channel.

25. The method according to claim 24, wherein the monitoring of the performance of the PSA cycle is performed using only the measured pressure within the purge channel and the measured pressure within the equalization channel.

26. The method according to claim 24, further comprising controlling a discharge from a waste surge tank connected to the waste channel by using the measured pressure within the purge channel.

27. The method according to claim 24, further comprising controlling a discharge from a waste surge tank connected to the waste channel by using a pressure measured within the surge tank.

28. The method according to claim 17, wherein the plurality of vessels includes four vessels.

29. The method according to claim 17, wherein the plurality of vessels includes seven or more vessels.

30. The method according to claim 17, wherein a pressure switch is used to perform measuring a pressure within the parallel channel.

31. The method according to claim 17, wherein a pressure transducer is used to perform measuring a pressure within the parallel channel.

32. The method according to claim 17, wherein a total number of vessels of the plurality of vessels used to perform the PSA cycle is determined such that at least four vessels of the plurality of vessels are open to the feed channel during each stage of the PSA cycle.

33. The method according to claim 17, wherein monitoring of the performance of the PSA cycle includes monitoring whether the measured pressure within the parallel channel is within a predetermined range.

34. The method according to claim 33, wherein, if the measured pressure within the parallel channel is outside of the predetermined range, then a malfunction determination is reached.

35. The method according to claim 17, wherein all stages of the PSA cycle are configured to minimize a distance between a vessel of the plurality of vessels that is providing purge gas and a vessel of the plurality of vessels that is receiving the purge gas from the first vessel.

36. The method according to claim 35, the plurality of vessels are linearly aligned and evenly spaced from one another, and wherein all stages of the PSA cycle are configured such that the providing purge gas vessel and the receiving purge gas vessel have no more than one other vessel therebetween in each stage of the PSA cycle.

37. The method according to claim 17, wherein, at start-up of the PSA system, pressure is measured in the product channel, and an actual rate of pressure increase in the pressure measured in the product channel is used to verify that the PSA system goes through a desired rate of pressure increase with time for a select number of vessels of the plurality of vessels that open to the product channel during a stage.

38. The method according to claim 37, wherein, if the actual rate of increase does not equal the desired rate of increase, then a malfunction determination is reached.

39. A method of monitoring a hydrogen generator system including a reactor connected to a pressure swing adsorption (PSA) system including a plurality of vessels having one or more layers of adsorbent material therein, a feed gas channel receiving feed gas from the reactor and being connected to the plurality of vessels via a respective first conduit with a first valve, a waste channel connected to the plurality of vessels via a respective second conduit with a second valve, a product channel connected to the plurality of vessels via a respective third conduit with a third valve, and a parallel channel connected to the plurality of vessels via a respective fourth conduit with a fourth valve, said method comprising:

measuring a pressure of flow upstream of the reactor;

measuring a pressure within the product channel during performance of a PSA cycle using the plurality of vessels; and monitoring pressure drop across the reactor using the measured pressure of flow upstream and an average of a high pressure value measured within the product channel.

* * * * *